United States Patent
Dubach et al.

(10) Patent No.: US 10,405,619 B2
(45) Date of Patent: Sep. 10, 2019

(54) METHOD FOR MOUNTING A DECORATIVE ELEMENT ON A SUPPORT AND SAID SUPPORT

(71) Applicant: The Swatch Group Research and Development Ltd, Marin (CH)

(72) Inventors: Alban Dubach, Bienne (CH); Stewes Bourban, Chabrey (CH); Yves Winkler, Schmitten (CH); Pierry Vuille, Les Emibois (CH); Jean-Claude Martin, Montmollin (CH)

(73) Assignee: The Swatch Group Research and Development Ltd, Marin (CH)

( * ) Notice: Subject to any disclaimer, the term of this patent is extended or adjusted under 35 U.S.C. 154(b) by 528 days.

(21) Appl. No.: 15/143,766

(22) Filed: May 2, 2016

(65) Prior Publication Data
US 2016/0324280 A1  Nov. 10, 2016

(30) Foreign Application Priority Data

May 4, 2015 (EP) .................................. 15166256

(51) Int. Cl.
*B23K 1/00* (2006.01)
*A44C 27/00* (2006.01)
(Continued)

(52) U.S. Cl.
CPC ............ *A44C 27/001* (2013.01); *A44C 17/04* (2013.01); *B23K 1/0008* (2013.01); *B23K 1/19* (2013.01);
(Continued)

(58) Field of Classification Search
CPC ...... A44C 17/04; A44C 27/00; B22D 25/025; B23P 5/00; B44C 1/26; B23K 2101/007; B23K 1/0008
See application file for complete search history.

(56) References Cited

U.S. PATENT DOCUMENTS

| 5,702,501 A * | 12/1997 | Osawa | B22F 1/0059 |
| | | | 75/252 |
| 2011/0103199 A1* | 5/2011 | Winkler | B21J 1/006 |
| | | | 368/285 |
| 2014/0178625 A1* | 6/2014 | Lauper | A44C 17/04 |
| | | | 428/67 |

FOREIGN PATENT DOCUMENTS

| CH | 707 349 A2 | 6/2014 |
| CH | 707 350 A2 | 6/2014 |

OTHER PUBLICATIONS

European Search Report dated Oct. 13, 2015 in European Application 15166256, filed on May 4, 2015 ( with English Translation).

* cited by examiner

*Primary Examiner* — David P Bryant
*Assistant Examiner* — Nirvana Deonauth
(74) *Attorney, Agent, or Firm* — Oblon, McClelland, Maier & Neustadt, L.L.P.

(57) ABSTRACT

The invention relates to a method for mounting at least one decorative element (3) on a support (2) comprising the steps of:
a. taking a support (2) provided with at least one cavity (4);
b. taking at least one decorative element (3);
c. filling said cavity with a composite filler material comprising at least one metal powder and at least one organic binder and having, at the moment of filling, a viscosity comprised between 1,000 mPa·s and 1,000,000 mPa·s;
d. heating the composite filler material to a higher temperature than its melting point to make it liquid;
e. allowing the filler material to cool to form a substrate (6);
f. making at least one housing (8) in said substrate (6);
(Continued)

g. mounting said decorative element (3) in said housing (8).

The present invention also concerns a decorative support (2) provided with at least one cavity (4) filled with said filler material forming a substrate (6) in which at least one housing (8) is formed, said housing (8) being arranged to receive said decorative element (3).

13 Claims, 3 Drawing Sheets

(51) Int. Cl.
  *A44C 17/04* (2006.01)
  *B23K 1/19* (2006.01)
  *B23K 35/02* (2006.01)
  *B23K 35/26* (2006.01)
  *B23K 35/28* (2006.01)
  *B23K 35/30* (2006.01)
  *B23K 35/32* (2006.01)
  *B23K 35/36* (2006.01)

(52) U.S. Cl.
  CPC ........ *B23K 35/025* (2013.01); *B23K 35/0244* (2013.01); *B23K 35/262* (2013.01); *B23K 35/282* (2013.01); *B23K 35/286* (2013.01); *B23K 35/302* (2013.01); *B23K 35/304* (2013.01); *B23K 35/3006* (2013.01); *B23K 35/3013* (2013.01); *B23K 35/3033* (2013.01); *B23K 35/322* (2013.01); *B23K 35/325* (2013.01); *B23K 35/3601* (2013.01); *B23K 35/3612* (2013.01)

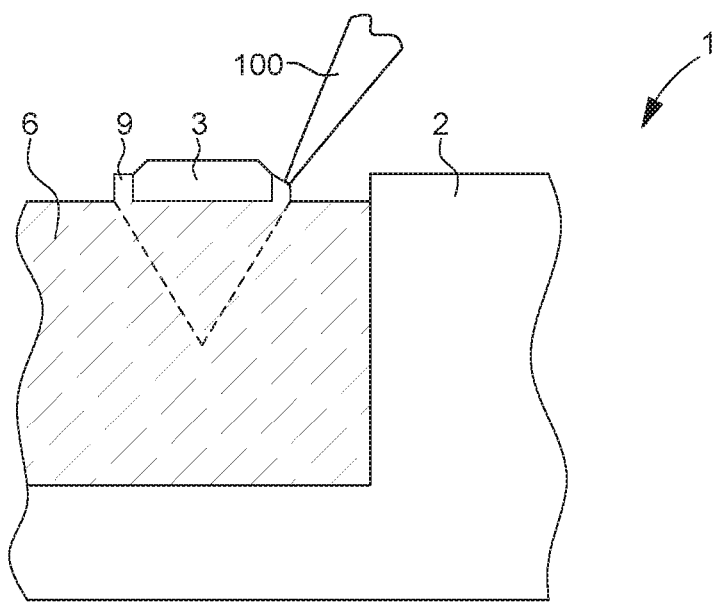
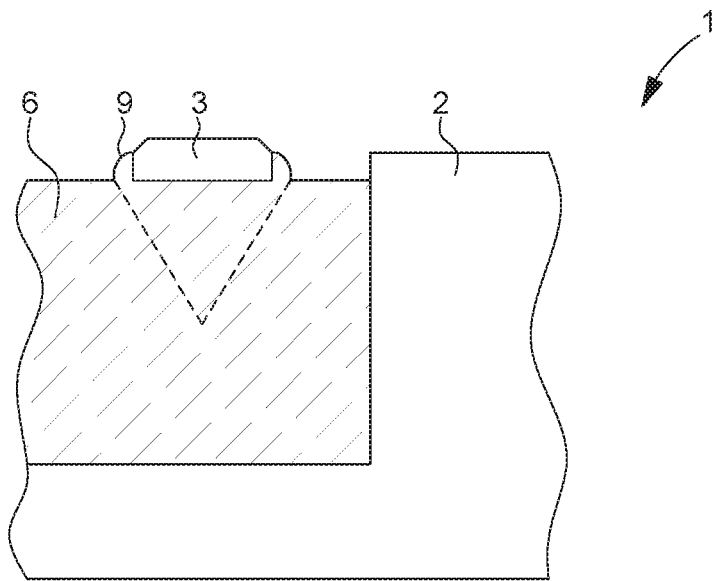

METHOD FOR MOUNTING A DECORATIVE ELEMENT ON A SUPPORT AND SAID SUPPORT

This application claims priority from European Patent Application No. 15166256.6 filed on May 4, 2015; the entire disclosure of which is incorporated herein by reference.

FIELD OF THE INVENTION

The present invention relates to a method for mounting at least one decorative element on a support. The invention also relates to a decorative support, intended to receive at least one decorative element and provided with at least one cavity filled with a filler material forming a substrate in which at least one housing is formed, said housing being arranged to receive said decorative element.

BACKGROUND OF THE INVENTION

There are known prior art decorative supports intended to be used on a wearable object, such as a watch or piece of jewellery, and having decorative elements, such as stones and especially precious stones.

For this reason, the support is generally made of metal alloy and is machined to form housings therein. The decorative elements may be mounted in these housings by pressing-in or by setting. In the case of assembly by setting, gripping means in the form of hooks are made during the machining operation. Generally speaking, these hooks are made with the material forming the wearable object, that is to say in one piece with the object. When a decorative element is required to be set, the latter is placed in a housing and the gripping means are cold worked and folded down so as to maintain said decorative element in the housing. This setting method is widely used for setting precious stones on metal supports since the metal has an advantageous capacity for plastic deformation. This capacity is even more advantageous with precious metals such as gold, since these precious metals are ductile and can easily be shaped.

Nevertheless, one drawback of this method is that it is limited to supports made of ductile metals or metal alloys. However, timepieces are increasingly made of materials with no plastic deformation, which are often hard and/or brittle, such as for example, ceramics, sapphire, silicon, composites (for example cermets) or even intermetallic alloys.

Consequently, it is no longer possible to use the current method for setting decorative elements, such as precious stones.

This setting operation can be replaced by an adhesive bonding operation. The drawback of adhesive bonding is that it cannot ensure 100% retention of the stones since, unlike setting, this technique does not involve mechanical retention of the stones. Indeed, as the bonded areas are in most cases exposed to the external environment (humidity, sweat, UV, air pollution, . . . ) this makes it difficult for the bond to hold in the long term. Consequently, the stones are not guaranteed to be held in place which is unacceptable for high quality products. There is also a risk of the adhesive salting-out products that are toxic and/or corrosive for the other components of the watch or piece of jewellery. Further, the decorative elements require prior machining, which may be difficult and expensive, particularly if the decorative elements have complicated geometries.

Another solution was proposed in EP Patent 2315673; this solution consists of inlaying a decorative element made of an amorphous material by pressing it into a support. This method requires the use of amorphous preforms. However, the number of alloys that exist in amorphous form is limited, so that it is not always possible to find an alloy having the required colour matching the watch or the piece of jewellery. For example, amorphous alloys with a yellow or red gold colour do not exist. Moreover, the inlaying method requires the application of a certain pressing force, so that it is difficult to utilise when the support is made of fragile or brittle material.

Another solution was proposed in EP Patent Application 2796297, consisting, in particular, in setting a decorative element in a substrate made of an amorphous alloy. However, the various methods describe heating and then cooling the amorphous metal which must necessarily be performed quickly to preserve the amorphous state of the metal. Rapid cooling creates a thermal shock which can cause internal stresses to appear in the support and thus lead to deformations or cracks. Further, the setting method necessarily involves deforming the gripping means, at the moment of setting, which may prove difficult when using an amorphous metal which might be difficult to deform due to its specific elastic properties. Moreover, as indicated above, the number of existing alloys in amorphous form is limited, so that it is not always possible to find an alloy having the desired colour matching the watch or piece of jewellery.

SUMMARY OF THE INVENTION

It is an object of the invention to overcome the various drawbacks of known methods for mounting a decorative element.

More specifically, it is an object of the invention is to provide a method for mounting a decorative element on a support, which can use a fragile or brittle support.

It is also an object of the invention to provide a method for mounting a decorative element on a support that can be adapted to the composition and colour of the support.

It is also an object of the invention to provide a method for mounting a decorative element on a support that can be implemented in a simple and economic manner.

To this end, the invention concerns a method for mounting at least one decorative element on a support comprising the steps of:
  a. taking a support provided with at least one cavity;
  b. taking at least one decorative element;
  c. filling said cavity with a composite filler material comprising at least one metal powder and at least one organic binder and having, at the moment of filling, a viscosity comprised between 1,000 mPa·s and 1,000,000 mPa·s;
  d. heating the composite filler material to a higher temperature than its melting point to make it liquid;
  e. allowing the filler material to cool to form a substrate;
  f. making at least one housing in said substrate;
  g. mounting said decorative element in said housing.

This method makes it possible to use a paste-like composite filler material, which is simple to apply locally with no stress on the support, and which does not require rapid cooling. Further, the composite filler material offers great flexibility in the choice of metal powder, of binder and of any additives, which makes it possible to improve the affinity of the composite filler material with the support.

The present invention also concerns a decorative element, intended to receive at least one decorative element and provided with at least one cavity filled with a filler material forming a substrate in which at least one housing is formed, said housing being arranged to receive said decorative element, said filler material being obtained from a composite filler material comprising at least one metal powder and at least one organic binder and having, at the moment of filling, a viscosity comprised between 1,000 mPa·s and 1,000,000 mPa·s.

The use of a composite material makes it possible to adapt the colour of the substrate to that of the support.

BRIEF DESCRIPTION OF THE DRAWINGS

The objects, advantages and features of the present invention will appear more clearly in the following detailed description of at least one embodiment of the invention, given solely by way of non-limiting example and illustrated by the annexed drawings, in which:

FIGS. 2 to 9 illustrate schematically the steps of a mounting method according to the invention.

DETAILED DESCRIPTION OF THE INVENTION

Figure 1:
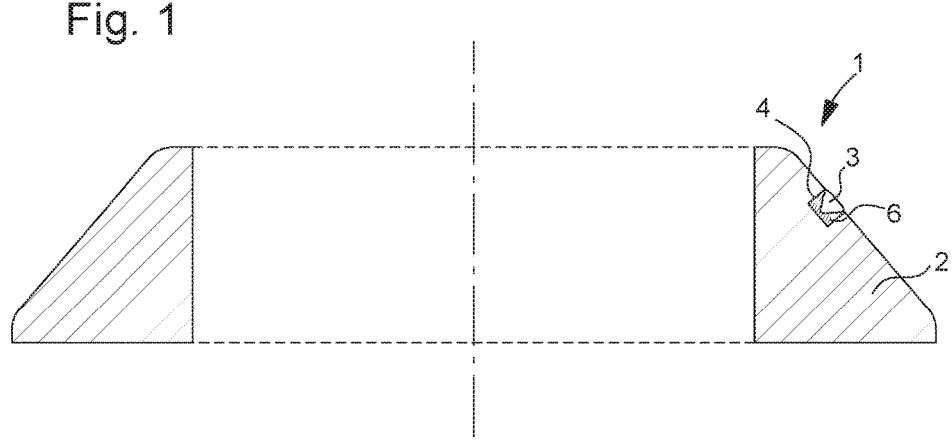
FIG. 1 is a schematic view of a decorative support using the present invention.

Referring to FIG. 1, there is shown a decorative part 1 comprising a decorative support 2 according to the invention in which is mounted a decorative element 3. Decorative part 1 is, for example, a watch bezel inlaid with indexes which form decorative elements. Decorative part 1 could also be a watch crystal or a dial or any internal or external part of a watch or of a timepiece. Decorative part 1 may also be a pen or a cuff link or a piece of jewellery such as a ring or an earring.

Support 2 may be made of any type of material, and more specifically any hard and brittle material, which does not have sufficient plastic deformation for implementation of a conventional setting method. The material of support 2 has a higher melting temperature that that of the composite filler material. Advantageously, support 2 is made of a material chosen from the group comprising ceramics, cermets, sapphire, ruby, diamond, silicon, quartz or glass. The surface of support 2 on which decorative element 3 is mounted may be flat or curved (concave or convex).

Support 2 has a cavity 4 filled with a filler material forming a substrate 6, said substrate 6 being used to receive decorative element 3 and to allow said decorative element 3 to be mounted on support 2. In particular, substrate 6 may comprise gripping means 5 which deform to hold decorative element 3.

Figure 2:
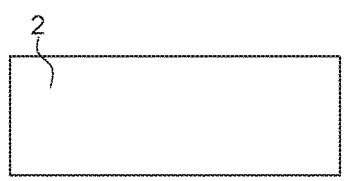
Figure 3:
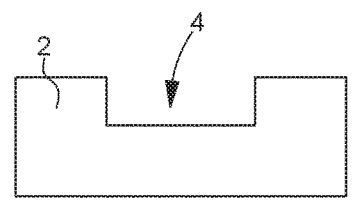

To this end, and according to the invention, the method for mounting decorative element 3 on support 2 comprises first step a) consisting of taking a support 2, preferably made of a material which does not deform plastically, such as a ceramic, as shown in FIG. 2, and in forming at least one cavity 4 in support 2, as shown in FIG. 3. Cavity 4 may be made, for example, by laser machining or any other technique suitable for the material of support 2. Preferably, cavity 4 has sides perpendicular to the visible surface of support 2. In order to improve the eventual hold of substrate 6 inside support 2, it is possible to machine inside cavity 4 back tapers or gripping holes or any other particular structuring of the bottom of the cavity.

Further, the method for mounting decorative element 3 on support 2 may advantageously comprise, prior to step c), an additional step h) of metallization of the surface of cavity 4. The walls of cavity 4 may be coated with a metallization layer to improve the adherence of the composite filler material on support 2. Such a metallization layer may be made from gold, nickel or chromium and have a higher melting temperature than that of the composite filler material.

Step b) of the method consists in taking a decorative element 3. These decorative elements 3 may be precious stones, such as diamonds or rubies, or non-precious stones such as zircons or any other suitable decorative element.

The next step c) of the method consists of filling cavity 4 with a composite filler material. According to the invention, the composite filler material comprises at least one metal powder, at least one organic binder and any additives, and has, at the moment of filling, a viscosity comprised between 1,000 mPa·s and 1,000,000 mPa·s.

Such a composite filler material is found, for example, in the form of a soldering paste, sold for example by Hilderbrand & Cie SA. The fact that the composite filler material is in paste form allows for very easy local application of the composite filler material inside cavity 4. In particular, the paste form of the composite filler material allows cavity 4 to be filled without any mechanical stress to support 2. Consequently, if support 2 is made of a brittle material, it is not likely to break. The viscosity of the composite filler material, at the moment of filling, i.e. at the moment of the application thereof inside cavity 4, is preferably comprised between 5,000 mPa·s and 500,000 mPa·s. The composite filler material may be thixotropic and have a higher viscosity at rest.

Preferably, the metal powder comprises at least one metallic element chosen from the group comprising, in the form of an element or alloy, gold, silver, copper, platinum, palladium, aluminium, titanium, zinc, tin, gallium, indium, nickel, silicon, germanium, and mixtures thereof.

Example metal powder compositions are set out in the Table below:

| Base | Family of compositions | Examples (in weight %) |
|---|---|---|
| Au | Fine gold | Au99.99 |
|  | 18 ct gold | Au—Cu—X |
|  | 14 ct gold | Au—Cu—Ag—X |
|  | 9 ct gold | Au—Cu—Pd—Ag—X avec X = Zn, Sn, |
|  | Au—Si, Au—Ge, Au—Sn | Ga, and/or In |
|  | Au—Cu | Au81Si19 |
|  |  | Au80Cu20 |
| Ag | Ag—Cu | Ag72Cu28 |
|  | Ag—Cu—X (X = Sn, Zn, Ti, P, and/or Ga) | Ag56Cu22Zn17Sn5, Ag65Cu20Pd15 |
|  | Ag—Pd—Ga | Ag82Pd9Ga9 |
|  | Ag—Al | Ag95Al5 |
| Cu | Cu | Cu99.99 |
|  | Cu—P | Cu92.8P7.2 |
|  | Cu—Ag—P | Cu80Ag15P5 |
|  | Cu—Zn | Cu60Zn40 |
|  | Cu—Mn—Ni | Cu67.5Mn23.5Ni9 |
| Pt | Fine Pt | Pt99.99 |
| Pd | Fine Pt | Pd99.99 |
|  | Pd—Ni | Pd60Ni40 |
|  | Pd—Ni—Si | Pd47Ni47Si6 |
| Al | Al—Si | Al88Si12 |
|  | Al—Si—X (X = Cu, Mg, and/or Zn) | Al86Si10Cu4 |
| Ti | Ti—Ni—Cu | Ti70Ni15Cu15 |
| Zn | Zn—Al | Zn78Al22 |
| Sn | Sn—Ag | Sn90Ag10 |
|  | Sn—Cu | Sn97Cu3 |
|  | Sn—In | Sn48In52 |
| Ni | Ni—P | Ni89P11 |
|  | Ni—Cr—P | Ni76Cr14P10 |
|  | Ni—Cr—Si—Fe—B | Ni73.2Cr14Si4.5Fe4.5B3.1 |

Precious alloys, made from platinum, palladium or gold, are particularly preferred, as they offer good corrosion resistance and good colour stability (no oxidation or tarnishing during wear).

The diameter of the metallic particles used for the metal powder is typically less than 500 μm and preferably less than 100 μm. The particle size distribution may be unimodal or multimodal. Multimodal distribution (e.g. bimodal) may be chosen so as to increase the volume percentage of the metallic phase in the total volume of the composite. Advantageously, the composite filler material comprises at least 50% by volume, and preferably at least 60% by volume, of metallic powder with respect to the total volume of the composite filler material.

The organic binder is generally in the form of a mixture of organic binders selected according to the desired properties of the composite filler material in the paste state. Preferably, the organic binder is chosen from the group comprising cellulose, glycerine, glycols, resins, petrol distillates, and mixtures thereof. The binder will be eliminated in the step of heating the composite filler material.

Advantageously, the composite filler material may comprise additives, such as at least one pickling or flux additive, to deoxidise the surfaces and to improve the wettability between said liquid composite filler material and the support. Pickling or flux additives are formed of a mixture of mineral salts and/or acids such as boric acid, borax, boron, alkaline borates (potassium pentaborate, potassium tetraborate, . . . ), alkali metal bifluorides (aluminium fluoride, potassium bifluoride, . . . ), chlorides (zinc chloride, lithium chloride, ammonium chloride, . . . ) acids (hydrochloric acid, phosphoric acid, etc. . . . ). The additives will be removed in the step of heating the composite filler material.

The next step d) of the method consists in heating the composite filler material to a temperature higher than its melting point to cause it to melt and to make it liquid. The composite filler material is heated by an energy means such as a furnace, a laser beam, an ionic beam or any other thermal means. The temperature depends on the nature of the composite filler material, and may be comprised between 200° C. and 1,000° C. for example. The liquid composite filler material has the advantage of filling the entire volume of cavity 4, regardless of its shape, particularly by means of its good wettability and/or by capillary effect.

The next step e) of the method consists in letting the filler material cool. The cooling temperature cycle is standard. Typically, during cooling, the temperature is lowered from 10° C./min to 100° C./min in industrial brazing furnaces. No rapid cooling is applied. The cooled and solidified filler material forms a substrate 6 in crystalline form.

Steps c) to e) may be performed at least twice in succession. Indeed, after the first time that cavity 4 is filled, there may be shrinkage of the filler material in cavity 4 after cooling. It is therefore necessary to apply at least a second layer of composite filler material inside cavity 4, to heat and then cool in accordance with steps c) to e) described above. Steps c) to e) are repeated until the filler material reaches the desired height in cavity 4.

The possible next step i), between steps e) and f), consists in removing the filler material present around cavity 4. This surplus filler material around cavity 4 may be removed by any appropriate method, such as polishing, machining etc . . .

Figure 4:
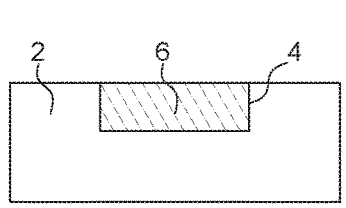

There is then obtained a support 2, as shown in FIG. 4, comprising a cavity 4 filled with a non-amorphous, purely metal substrate 6, the organic binder and additives having been burnt off or evaporated in heating step d).

Figure 5:
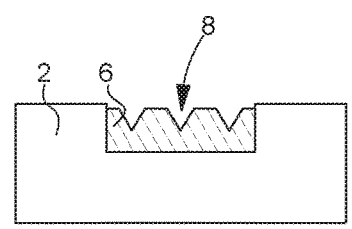

The next step f) of the method consists in making at least one housing 8 in substrate 6, as shown in FIG. 5. This step can be achieved by conventional methods such as machining, milling, drilling, etc.

The next step g) of the method consists in mounting decorative element 3 in housing 8.

According to a first variant, step g) of mounting decorative element 3 is achieved by driving in said element. To achieve this, decorative element 3 is made to exhibit slightly larger dimensions than those of cavity 4 and to be forcibly pressed into said cavity 4.

Figure 6:
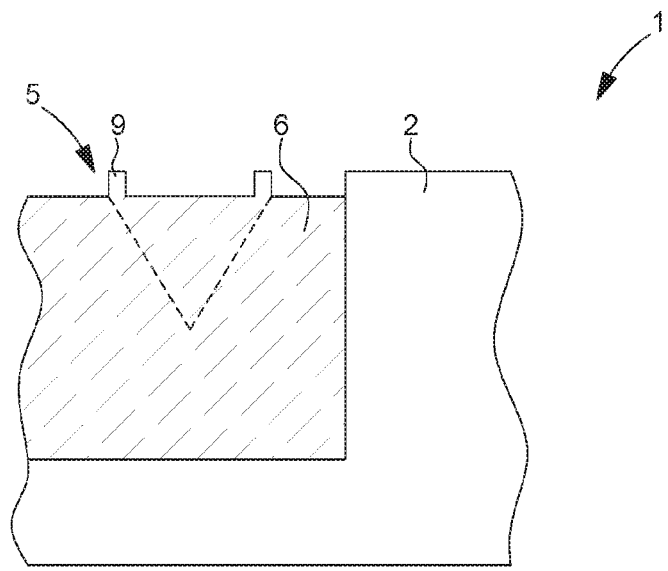
Figure 7:
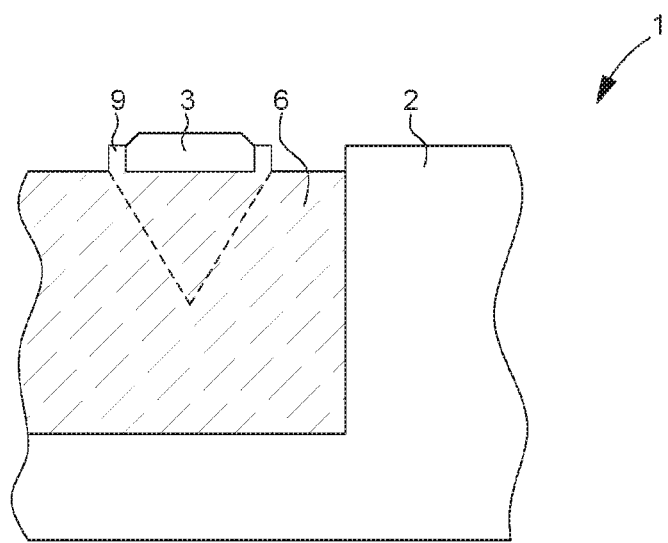

According to a second variant, step g) of mounting decorative element 3 is achieved by setting. In this case, step g) comprises the making of gripping means 5 in substrate 6 and the setting of decorative element 3 by deforming said gripping means 5 so as to maintain said decorative element 3 inside its housing 8. More specifically, gripping means 5 take the form of at least one setting element 9. This setting element 9, in the case for example of a bead setting, consists of studs or beads arranged on the periphery of each housing 8. These studs 9, seen in FIGS. 6 and 7, are made by machining before or after housings 8 are made. Indeed, when housings 8 are machined, some of the material of substrate 6 is removed to form these setting elements 9. Preferably, in the case of a bead setting, there are ideally provided four setting beads 9 in proximity to housing 8.

It is evident that other types of setting may be envisaged, such as a closed setting, baguette setting, rail setting or invisible setting. For example, a closed setting consists of a single setting element 9 extending over the periphery of decorative element 3. Baguette setting is used to set decorative elements 3 cut into a baguette. This setting consists in providing setting elements 9 which extend parallel to each side of decorative element 3 and are folded down on the latter. With an invisible setting, setting elements 9 are arranged as projecting portions disposed in housing 8. These projecting portions cooperate with at least one groove made on said decorative element 3 so that the setting is accomplished by inserting decorative element 3 into housing 8 until the projecting portions are inserted in said groove.

The setting step consists in placing decorative element 3 inside housing 8 and in deforming gripping means 5 to press them onto said decorative element 3. Consequently, the latter is maintained inside housing 8. The deformation of gripping means 5 is achieved by means of a tool called a beading tool 100 used to deform each setting element 9, as shown in FIG. 8. There is thus obtained the set decorative element 3 as shown in FIG. 9. The filler material forming substrate 6 is sufficiently ductile to allow the gripping means to deform.

It is evident that any other suitable method may be used for mounting the decorative element in the substrate. One advantage of the invention is that it enables the decorative element to be mounted in any type of material, and especially in a hard and/or brittle material. Indeed, the principle used is the principle of an insert, that is to say a substrate made of material capable of deformation is inserted in a non-plastically deformable material so as to permit the mounting of a decorative element, such as a setting, and to create the illusion that it is the non-plastically deformable material that is set. The material of the support, which is non-plastically deformable, does not undergo any mechanical stress and therefore is unlikely to break.

In order to maintain the illusion of a mount in support 2, the width of cavity 4 is ideally arranged to be equal to that of decorative element 3. Consequently, the distance between decorative element 3 and the edge of cavity 4 must be reduced to a minimum, and ideally to zero, so that the filler material is not visible and to give the impression that decorative element 3 remains embedded in support 2, made for example of ceramic, and not in the filler material. In practice, the distance between decorative element 3 and the edge of cavity 4 will depend on the dimensions and shapes of the decorative elements 3. For example, for a decorative element 3 with a diameter of 1 mm, the distance between decorative element 3 and the edge of cavity 4 will be 0.45 mm.

Further, the use of a composite filler material makes it possible to have a very large number of different compositions, for forming a substrate whose colour is adjusted, for example, to the colour of the decorative element or with respect to the other components of the component in which the decorative support is used.

Moreover, the use of a composite filler material makes it possible to have a very large number of different compositions improving the affinity of the composite filler material with the support. In particular, the use of a composite filler material offers great flexibility in the choice of composition to match the chemistry of the composite filler material to that of the support. For example, the basic element forming the metallic powder of the composite filler material is the same as the basic element forming support 2, in order to ensure chemical affinity between the composite filler material and the support. It is also possible to choose the composition of the composite filler material such that the latter has a similar thermal coefficient of expansion to that of the support. The addition of a pickling agent improves the wettability of the composite filler material.

What is claimed is:

1. A method for mounting at least one decorative element on a support, the method comprising the steps of:
   a. taking a support provided with at least one cavity;
   b. taking at least one decorative element;
   c. filling said cavity with a composite filler material comprising at least one metal powder and at least one organic binder and having, at the moment of filling, a viscosity comprised between 1,000 mPa·s and 1,000,000 mPa·s;
   d. subsequent to said filling step, heating the composite filler material to a higher temperature than its melting point to make it liquid;
   e. allowing the filler material to cool to form a substrate;
   f. making at least one housing in said substrate; and
   g. mounting said decorative element in said housing.

2. The method according to claim 1, wherein the composite filler material comprises at least 50% by volume of metallic powder with respect to the total volume of the composite filler material.

3. The method according to claim 2, wherein the composite filler material comprises at least 60% by volume of metallic powder with respect to the total volume of the composite filler material.

4. The method according to claim 1, wherein the composite filler material further comprises at least one pickling agent.

5. The method according to claim 1, wherein the metal powder comprises at least one metallic element selected from the group consisting of, in the form of an element or alloy, gold, silver, copper, platinum, palladium, aluminium, titanium, zinc, tin, gallium, indium, nickel, silicon, germanium, and mixtures thereof.

6. The method according to claim 1, wherein the organic binder of the composite filler material is selected from the group consisting of cellulose, glycerine, glycols, resins, petrol distillates, and mixtures thereof.

7. The method according to claim 1, wherein step g) is achieved by driving in the decorative element.

8. The method according to claim 1, wherein step g) is achieved by setting, and wherein step g) comprises the making of gripping means in the substrate and the setting of the decorative element by deforming said gripping means in order to maintain said decorative element inside the housing.

9. The method according to claim 1, wherein the method further comprises, prior to step c), a step h) of the metallization of the surface of the cavity of the support.

10. The method according to claim 1, wherein the method further comprises, between steps e) and f), a step i) consisting in removing any filler material present around the cavity.

11. The method according to claim 1, wherein steps c) to e) are performed at least twice in succession.

12. The method according to claim 1, wherein the substrate is a crystalline substrate.

13. The method according to claim 1, wherein the cooling in step e) is not a rapid cooling, and the temperature is lowered at a rate of 10° C/min to 100° C/min.

* * * * *